United States Patent [19]

Kafka et al.

[11] Patent Number: 5,008,887
[45] Date of Patent: Apr. 16, 1991

[54] MODE-LOCKED FIBER LASER

[76] Inventors: James D. Kafka, 928 Wright Ave. #302, Mountain View, Calif. 94043; Thomas M. Baer, 537 Drucilla Dr., Mountain View, Calif. 94040

[21] Appl. No.: 340,448

[22] Filed: Apr. 19, 1989

[51] Int. Cl.$^5$ .............................................. H01S 3/30
[52] U.S. Cl. .......................................... 372/6; 372/18; 372/94
[58] Field of Search .................. 372/6, 18, 12, 26, 27, 372/28; 350/96.13, 96.14

[56] References Cited

U.S. PATENT DOCUMENTS

| | | | |
|---|---|---|---|
| 3,497,828 | 12/1967 | Telk et al. | 372/12 |
| 4,635,263 | 1/1987 | Mollenauer | 372/6 |
| 4,637,025 | 1/1987 | Snitzer et al. | 372/6 |
| 4,728,168 | 3/1988 | Alferness et al. | 372/6 |
| 4,835,778 | 5/1989 | Kafka et al. | 372/6 |

*Primary Examiner*—Frank Gonzalez
*Assistant Examiner*—Susan S. Morse

[57] ABSTRACT

A mode-locked fiber laser having a length greater than 10 meters is equipped with an intracavity shutter or "mode-locking" device. The intracavity shutter is a broad bandwidth modulator which allows fast shutter on and off speeds, allowing short on times as well as short on-off and off-on transition times. The fiber and the modulator may be integrated. The fiber is comprised of a material doped with an active species having a long lifetime upper state, wherein the upper state lifetime is longer than the round trip time of a pulse through the fiber. The laser may be configured as either a linear laser or a ring cavity laser. The present invention allows short pulse widths with high pulse energies.

41 Claims, 2 Drawing Sheets

MODE-LOCKED FIBER LASER

BACKGROUND OF THE INVENTION

1. Field Of The Invention

The present invention relates to fiber lasers. More particularly, the present invention relates to mode locked fiber lasers.

2. The Prior Art

Fiber lasers are known in the prior art. Such lasers have been coupled to narrow band bulk mode lockers, such as acousto-optic devices. For example, see I. P. Alcock, A. I. Ferguson, D. C. Hanna and A. C. Tropper, Electron. Lett. 22, 268 (1986); and I.N. Duling III, L. Goldberg and J. F. Weller, in Digest of Optical Society of America Annual Meeting (Optical Society of America, Washington, D.C., 1988), paper FU5; to be published in Electron. Lett. A sinusoidally driven integrated optic modulator at 30 MHz has been reported for use with a fiber laser for the purpose of mode locking in order to match pulse repetition rate to fiber lengths in the range of 3.5 meters. G. Geister, et al., *Neodymium—Fiber Laser with Integrated Optic Mode Locker* Optics Communications, Vol. 68, No. 3, October, 1988, p. 187.

BRIEF DESCRIPTION OF THE INVENTION

A mode-locked fiber laser having a length greater than 10 meters is equipped with an intracavity shutter or "mode-locking" device. The intracavity shutter is a broad bandwidth modulator which allows fast shutter on and off speeds, allowing short on times as well as short on-off and off-on transition times. The fiber and the modulator may be integrated. The fiber is comprised of a material doped with an active species having a long lifetime upper state, wherein the upper state lifetime is longer than the round trip time of a pulse through the fiber. The present invention allows short pulse widths with high pulse energies.

DETAILED DESCRIPTION OF A PREFERRED EMBODIMENT

Figure 1:
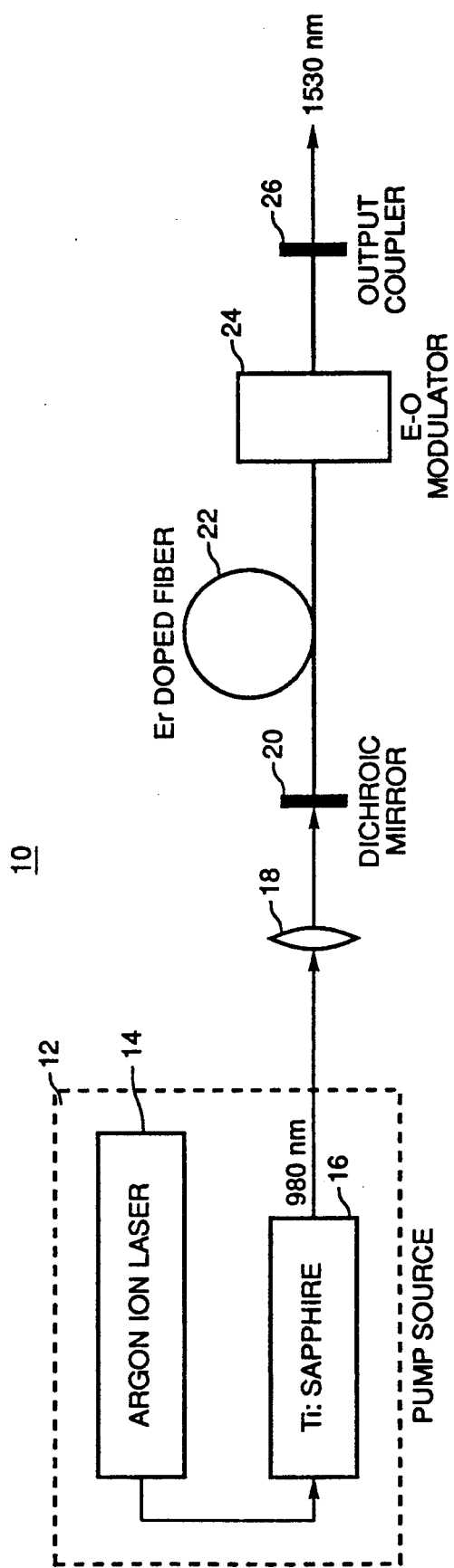
FIG. 1 is a diagram showing a first embodiment of a mode-locked fiber laser according to the present invention.

Referring first to FIG. 1, a diagram of a first embodiment of the present invention, a mode-locked fiber laser 10 is shown to include pump source 12, including an Argon ion laser 14 and a Titanium sapphire solid state laser 16. The output of pump source 12 is radiation at an approximate wavelength of 980 nanometers. A presently preferred pump source is a laser diode or laser diode array operating at 980 nm or alternately at 655 nm.

The output radiation from the pump source 12 is focused by lens 18. Lens 18 may be a 5×microscope objective lens. Its purpose is to focus the pump light into the fiber laser.

The pump radiation is then passed through dichroic mirror 20. The purpose of dichroic mirror 20 is to enable the pump radiation to be efficiently coupled into the laser cavity, while preventing appreciable amounts of the laser output light to be passed there through. The pump radiation from pump source 12 is absorbed in Erbium-doped fiber 22. Fiber 22 may be a single mode Erbium-doped fiber, available from Corning Glass Works in Corning, N.Y. In one embodiment of the present invention the fiber employed in the present invention should have a length so as to allow one pulse to be traveling through the fiber at a time.

Erbium-doped fibers operate at 1.53 microns, which is near the minimum loss and dispersion wave length for telecommunications fiber. Moreover, at this wavelength, fiber oscillators may be constructed with negative group velocity dispersion (GVD) possibly leading to shorter pulses due to soliton pulse shaping.

Although Erbium is a presently-preferred species, any species which has a lifetime longer than the round trip time of a pulse through the fiber is preferred, since it will allow high energy pulses to be generated. Other materials such Neodymium (Nd) have been found to be satisfactory.

Included within the lasing cavity is an electro-optic modulator 24 which is used as an inter-cavity shutter. Electro-optic modulator 24 should be a broad bandwidth modulator, with a fast shutter turn-on and shutter turn-off time thus allowing a short on-time. This intracavity shutter is used as a mode-locking device. It may be integrated with the fiber or it may exist as a separate element within the cavity.

A lithium niobate guided wave modulator has been found to be satisfactory for the present invention. A model MZ 315P, available from Crystal Technology, Inc., in Palo Alto, Calif. is presently preferred. This modulator has a wide bandwidth, allowing very short shutter widths (approximately 100 Psec) and it has a high on-to-off ratio of 100:1. Unlike most acousto-optic mode lockers which are driven with a sine wave, the guided wave modulator may be driven with a low voltage train of high rise/fall time pulses of short duration. Thus, the shutter width is independent of the repetition rate.

The other end of the optical cavity is defined by output coupler 26, which is partially transmissive at the output frequency which, in the case of an Erbium-doped fiber, is approximately 1530 nanometers.

The energy per pulse generated by the fiber laser of the present invention is determined by dividing the total output power by the pulse repetition rate. For example, at 10 milliwatts of power at a 1 megahertz repetition rate, a 10 nanojoule energy per pulse output is obtainable.

For the embodiment of FIG. 1, the pulse repetition rate of the fiber laser of the present invention may be expressed as a function of the speed of light C, the index of refraction n of the fiber medium, and the length L of the fiber as follows:

$$\text{Rep rate} = \frac{C}{2nL} \quad [1]$$

The pulse repetition rate may be set to any integer multiple of equation [1]; a present practical limit is thought to be about 1,000,000, although larger multiples are theoretically possible.

In a fiber laser system having a pulse repetition rate of 1 megahertz and an index of refraction in the medium of 1.5, it follows from equation [1], that the length of the fiber required is approximately 100 meters.

For a ring laser, the repetition rate may be expressed as follows:

$$\text{Rep rate} = \frac{C}{nL} \quad [2]$$

As with the linear fiber laser, the pulse repetition rate for the ring laser may be set to any integer multiple of equation [2]; a present practical limit is thought to be about 1,000,000, although larger multiples are theoretically possible.

The reciprocal of the pulse repetition rate expressed as the Greek letter Tau ($\tau$), equals the time between pulses and should be less than the lifetime of the upper lasing level of the active material.

Figure 2:
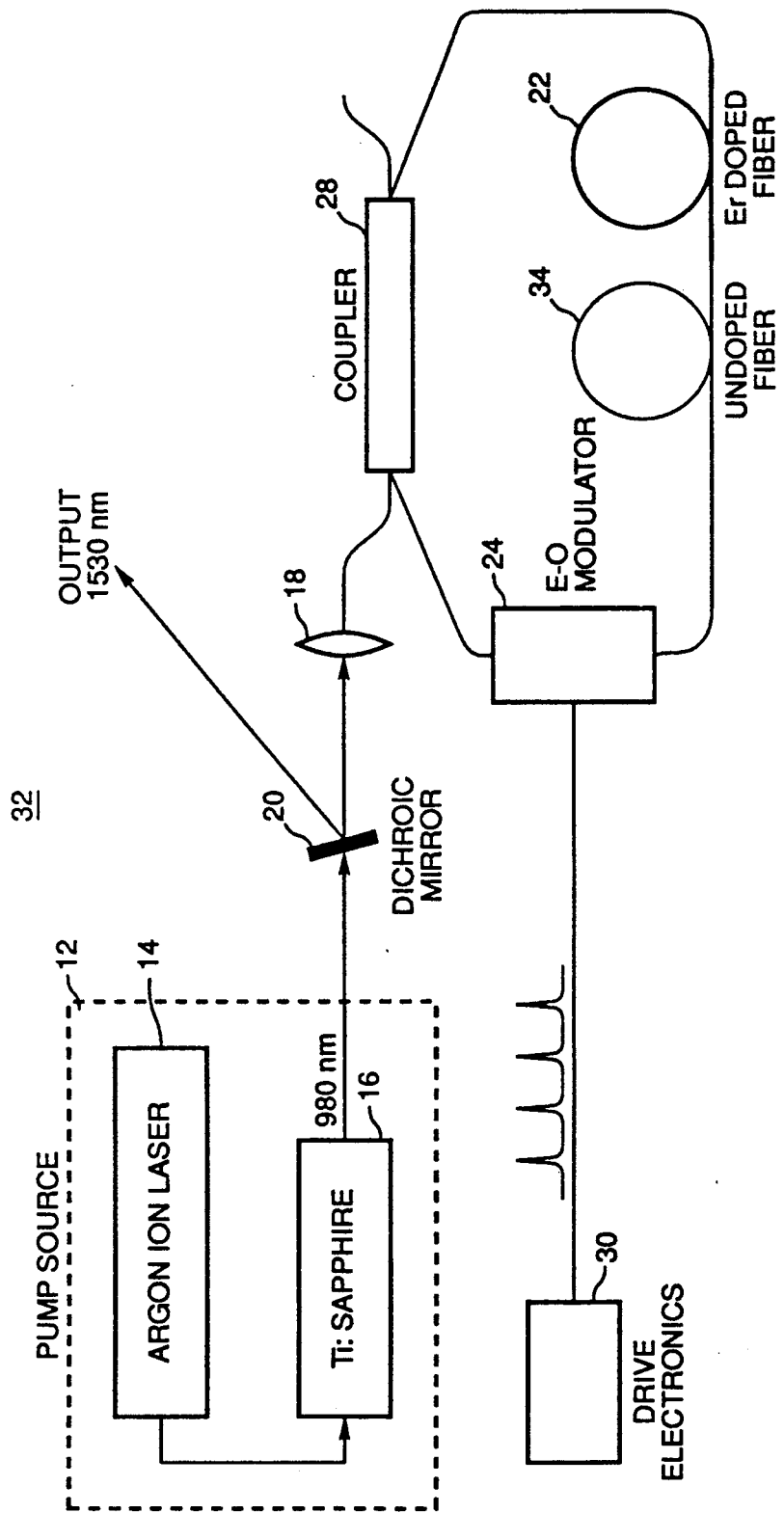
FIG. 2 is a diagram of a second, presently-preferred, embodiment of a fiber laser according to the present invention.

Referring now to FIG. 2, a presently-preferred embodiment of a fiber laser system 32 includes pump source 12, including an Argon ion laser 14 driving a Titanium Sapphire laser 16. The 980 nanometer output of the Titanium Sapphire laser 16 is fed into the optical cavity through dichroic mirror 20. Unlike the embodiment of FIG. 1, where dichroic mirror 20 is part of the laser cavity, dichroic mirror 20 in the embodiment of FIG. 2 is placed at an angle so that it may transmit the pump source and reflect output laser radiation from the fiber laser.

In the embodiment of FIG. 2, the laser cavity is a ring cavity. Pump light is focused in the cavity via lens 18 and fed to coupler 28. Coupler 28 couples the pump source radiation into the fiber ring and allows only a controlled amount, here 50%, of the 1530 nanometer laser output light to be coupled out of the ring. Dichroic mirror 20 is used to separate this output from the pump light. Alternately, dichroic mirror 20 may be eliminated and the laser output radiation may be obtained through the other end of coupler 28 as is known in the art.

The ring cavity of the fiber optic laser of the embodiment of FIG. 2 includes Erbium doped fiber 22, electro-optic modulator 24, and fiber optic coupler 28. Fiber optic coupler 28 may be a Part No. 945-142-1000 available from Allied Amphenol Products in Lisle, Ill. Electro-optic modulator 24 is driven by drive electronics 30, which may be any electronic circuit known to those of ordinary skill in the art capable of supplying voltage pulses of a magnitude sufficient to activate electro-optic modulator 24.

The embodiment of FIG. 2 schematically shows an additional length of undoped fiber 34 in the ring cavity. Those of ordinary skill in the art will understand that the cavity may optionally include a second portion of an undoped fiber in addition to first portion of a doped fiber. The length of the undoped fiber may vary; lengths of several hundred meters to several kilometers are thought to be satisfactory. In a presently preferred embodiment, a second portion of undoped fiber of 2 km in length is used. It is presently preferred that the doped fiber portion of the ring cavity be at least 70 meters in length. By varying the doping level, the preferred length may be varied from 1 meter to hundreds of meters or more as will be appreciated by those of ordinary skill in the art.

In this particular embodiment constructed according to FIG. 2, the pump source is of Ti:sapphire laser which produces 300 milliwatts at a wavelength of 980 mn. The pump light is focused into one port of a fiber optic coupler. The coupler transmits most of the pump radiation and is a 50% splitter at 1.5 microns. The gain medium consists of 70 meters of Erbium-doped silicon fiber (14 ppm $Er^{3+}$). This fiber is attached to the fiber pigtail of the input of the modulator. The output of the modulator is connected to the coupler to close the loop. All of the fiber connections are made using a fusion splicer and the resulting fiber laser is completely integrated.

The modulator is biased off by applying a DC voltage of 12 volts. A step recovery diode generates a 100 psec pulse train with a peak amplitude of −12 volts which is applied to the modulator. At a frequency of 100 $MH_z$, a step recovery diode assembly model No. 33002A available from Hewlett Packard of Palo Alto, Calif., driven by a 1 watt, 100 $MH_z$ sinusoidal wave source into 50 ohms, has been found to be satisfactory. At frequencies other than 100 $MH_z$, the step recovery diode assembly may be driven by a source of short pulses instead of sinusoidal waves. Alternately, the step recovery diode may be biased for use at other frequencies in the manner disclosed in Hewlett Packard Application Note No. 918, expressly incorporated herein by reference.

While a presently-preferred embodiment of the invention has been disclosed, those of ordinary skill in the art will, from an examination of the within disclosure and drawings be able to configure other embodiments of the invention. These other embodiments are intended to fall within the scope of the present invention which is to be limited only by the scope of the appended claims.

What is claimed is:

1. A mode-locked fiber laser, including:
   a pump source,
   a linear laser cavity including a single mode doped optical fiber, said cavity having a first end defined by an output coupler, said output coupler being partially transmissive at the laser output wavelength, and having a second end defined by a dichroic mirror having a high reflectivity at the laser output wavelength an a high transmissibility at the wavelength of radiation emitted from said pump source,
   a broad bandwidth electro-optic modulator in said cavity,
   means for coupling radiation from said pump source into said laser cavity, and
   control means for operating said modulator such that its turn off and turn on times are shorter than 2 nanosecond and such that its repetition rate is Xc/2nL, where x is an integer from 1 to 1,000,000, C is the speed of light, n is the index of refraction of the fiber, and L is the total length of said optical fiber n is the index of fraction of the fiber, and L is the length of said optical fiber.

2. The mode-locked fiber laser of claim 1 wherein said fiber has a length greater than 10 meters.

3. The mode-locked fiber laser of claim 2 wherein said broad band electro-optic modulator is a lithium niobate guided wave modulator and further including means for providing fast rise and fall time pulses having a duty cycle of less than 50% to said modulator.

4. The mode locked fiber laser of claim 3 wherein said fiber is doped with an active species having an upper state lifetime longer than the round trip time of a pulse through said optical fiber.

5. The mode-locked fiber laser of claim 3 wherein said fiber is doped with erbium.

6. The mode-locked fiber laser of claim 3 wherein said fiber is doped with neodymium.

7. The mode-locked fiber laser of claim 4 wherein said fiber has a length greater than 50 meters.

8. The mode-locked fiber laser of claim 2 wherein said modulator is operated at a frequency less than 10 megahertz.

9. The mode-locked fiber laser of claim 5 wherein said pump source has a wavelength of 980 nm.

10. The mode-locked fiber laser of claim 5 wherein said pump source has a wavelength of 660 nm.

11. A mode-locked fiber laser, including:
a pump source,
a linear laser cavity including a single mode optical fiber having a first doped portion of a first length and having a second undoped portion of a second length, said cavity having a first end defined by an output coupler, said output coupler being partially transmissive at the laser output wavelength, and having a second end defined by a dichroic mirror having a high reflectivity at the laser output wavelength an a high transmissibility at the wavelength of radiation emitted from said pump source,
a broad bandwidth electro-optic modulator in said cavity,
means for coupling radiation from said pump source into said laser cavity, and
control means for operating said modulator such that its turn off and turn on times are shorter than 2 nanoseconds and such that its repetition rate is xC/2nL, where x is an integer from 1 to 1,000,000, C is the speed of light, n is the index of refraction of the fiber, and L is the total length of said optical fiber.

12. The mode-locked fiber laser of claim 11 wherein said fiber has a length greater than 10 meters.

13. The mode-locked fiber laser of claim 12 wherein said broad band electro-optic modulator is a lithium niobate guided wave modulator and further including means for supplying fast rise and fall time pulses to said modulator.

14. The mode locked fiber laser of claim 13 wherein said fiber is doped with an active species having an upper state lifetime longer than the round trip time of a pulse through said optical fiber.

15. The mode-locked fiber laser of claim 13 wherein the first doped portion of said fiber is doped with erbium.

16. The mode-locked fiber laser of claim 12 wherein the first doped portion of said fiber is doped with neodymium.

17. The mode-locked fiber laser of claim 14 wherein said fiber has a length greater than 50 meters.

18. The mode-locked fiber laser of claim 15 wherein said pump source has a wavelength of 980 nm.

19. The mode-locked fiber laser of claim 15 wherein said pump source has a wavelength of 660 nm.

20. The mode-locked fiber laser of claim 12 wherein the first doped portion of said fiber has a length of approximately 70 meters and the second undoped portion of said fiber has a length in the range of approximately 1-2 km.

21. The mode locked fiber laser of claim 13 wherein said pump source is a laser diode pump source.

22. A method for operating a mode locked fiber laser including a pump source, a linear laser cavity including a single mode doped optical fiber, said cavity having a first end defined by an output coupler, said output coupler being partially transmissive at the laser output wavelength, and having a second end defined by a dichroic mirror having a high reflectivity at the laser output wavelength an a high transmissibility at the wavelength of radiation emitted from said pump source, a broad bandwidth electro-optic modulator in said cavity, means for coupling radiation from said pump source into said laser cavity, and control means for operating said modulator such that its turn off and turn on times are shorter than 2 nanosecond, including the steps of:
energizing said pump source,
optically coupling radiation from said pump source into said cavity,
operating said control means to achieve a repetition rate of said modulator of xC/2nL, where x is an integer from 1 to 1,000,000, C is the speed of light, n is the index of refraction of the fiber, and L is the length of the fiber, so that the cavity round trip time of the laser pulse is matched to said repetition rate.

23. A mode-locked fiber laser, including:
a pump source,
a ring laser cavity including a single mode doped optical fiber, said cavity including coupling means for coupling radiation from said pump source into said cavity and for coupling laser radiation out of said cavity, said coupler means being partially transmissive at the laser output wavelength and highly transmissive at the wavelength of radiation emitted from said pump source,
a broad bandwidth electro-optic modulator in said cavity,
means for focussing radiation from said pump source into said coupling means, means for extracting laser radiation from said ring cavity, and
control means for operating said modulator such that its turn off and turn on times are shorter than 2 nanoseconds and such that its repetition rate is xC/nL, where x is an integer from 1 to 1,000,000, C is the speed of light, n is the index of refraction of the fiber, and L is the total length of said optical fiber.

24. The mode-locked fiber laser of claim 23 wherein said fiber has a length greater than 10 meters.

25. The mode-locked fiber laser of claim 24 wherein said broad band electro-optic modulator is a lithium niobate guided wave modulator and further including means for providing fast rise and fall time pulses having a duty cycle of less than 50% to said modulator.

26. The mode locked fiber laser of claim 24 wherein said fiber is doped with an active species having an upper state lifetime longer than the time it takes a pulse to traverse said ring cavity.

27. The mode-locked fiber laser of claim 24 wherein said fiber is doped with erbium.

28. The mode-locked fiber laser of claim 24 wherein said fiber is doped with neodymium.

29. The mode-locked fiber laser of claim 23 wherein said fiber has a length greater than 50 meters.

30. The mode-locked fiber laser of claim 27 wherein said pump source has a wavelength of 980 nm.

31. The mode-locked fiber laser of claim 27 wherein said pump source has a wavelength of 660 nm.

32. A mode-locked fiber laser, including:
a pump source,
a ring laser cavity including a single mode doped optical fiber, said fiber having a first doped portion of a first length and a second undoped portion of a second length, said cavity including coupling means for coupling radiation from said pump source into said cavity and for coupling laser radiation out of said cavity, said coupler means being partially transmissive at the laser output wavelength and highly transmissive at the wavelength of radiation emitted from said pump source, a broad bandwidth electro-optic modulator in said cavity, means for focussing radiation from said pump source into said coupling means, means for extracting laser radiation from said ring cavity, and control means for operating said modulator such that its turn off and turn on times are shorter than 2 nanoseconds and such that its repetition rate is xC/nL, where x is an integer from 1 to 1,000,000, C is the speed of light, n is the index of refraction of the fiber, and L is the total length of said optical fiber.

33. The mode-locked fiber laser of claim 32 wherein said fiber has a length greater than 10 meters.

34. The mode-locked fiber laser of claim 33 wherein said broad band electro-optic modulator is a lithium niobate guided wave modulator and further including means for providing fast rise and fall time pulses having a duty cycle of less than 50% to said modulator.

35. The mode locked fiber laser of claim 33 wherein said fiber is doped with an active species having an upper state lifetime longer than the time it takes a pulse to traverse said ring cavity.

36. The mode-locked fiber laser of claim 33 wherein said fiber is doped with erbium.

37. The mode-locked fiber laser of claim 33 wherein said fiber is doped with neodymium.

38. The mode-locked fiber laser of claim 32 wherein said fiber has a length greater than 50 meters.

39. The mode-locked fiber laser of claim 36 wherein said pump source has a wavelength of 980 nm.

40. The mode-locked fiber laser of claim 36 wherein said pump source has a wavelength of 660 nm.

41. A method for operating a mode locked fiber laser including a pump source, a ring laser cavity including a single mode doped optical fiber, said fiber having a first doped portion of a first length and a second undoped portion of a second length, said cavity including coupling means for coupling radiation from said pump source into said cavity and for coupling laser radiation out of said cavity, said coupler means being partially transmissive at the laser output wavelength and highly transmissive at the wavelength of radiation emitted from said pump source, means for focussing radiation from said pump source into said coupling means, means for extracting laser radiation from said ring cavity, a broad bandwidth electro-optic modulator in said cavity, and control means for operating said modulator such that its turn off and turn on times are shorter than 2 nanoseconds, including the steps of:

energizing said pump source, optically coupling radiation from said pump source into said cavity, operating said control means to achieve a repetition rate of said modulator of xC/2nL, where x is an integer from 1 to 1,000,000, C is the speed of light, n is the index of refraction of the fiber, and L is the length of the fiber, so that the cavity trip time of the laser pulse is matched to said repetition rate.

* * * * *

UNITED STATES PATENT AND TRADEMARK OFFICE
CERTIFICATE OF CORRECTION

PATENT NO. : 5,008,887

DATED : April 16, 1991

INVENTOR(S) : James D. Kafka

It is certified that error appears in the above-identified patent and that said Letters Patent is hereby corrected as shown below:

On the title page, after item (76), insert item (21):

Assignee: Spectra-Physics, Inc.

Signed and Sealed this

Thirtieth Day of August, 1994

Attest:

BRUCE LEHMAN

Attesting Officer

Commissioner of Patents and Trademarks